(12) United States Patent
Sano et al.

(10) Patent No.: US 11,112,111 B2
(45) Date of Patent: Sep. 7, 2021

(54) CEMENT KILN BURNER DEVICE AND METHOD FOR OPERATING THE SAME

(71) Applicant: Taiheiyo Cement Corporation, Tokyo (JP)

(72) Inventors: Yuya Sano, Sakura (JP); Kana Horiba, Sakura (JP); Kouichi Naitou, Tokyo (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 16/643,130

(22) PCT Filed: Sep. 26, 2018

(86) PCT No.: PCT/JP2018/035775
§ 371 (c)(1),
(2) Date: Feb. 28, 2020

(87) PCT Pub. No.: WO2020/065786
PCT Pub. Date: Apr. 2, 2020

(65) Prior Publication Data
US 2021/0222875 A1 Jul. 22, 2021

(51) Int. Cl.
*F23L 1/00* (2006.01)
*C04B 7/45* (2006.01)
(Continued)

(52) U.S. Cl.
CPC .............. *F23L 1/00* (2013.01); *C04B 7/4423* (2013.01); *C04B 7/45* (2013.01); *F23D 1/00* (2013.01); *F23D 2201/20* (2013.01); *F23G 5/20* (2013.01)

(58) Field of Classification Search
CPC ........ F23D 91/02; F23D 1/02; F23D 2201/20; F23D 2204/00; F23D 2900/01001; F23L 1/00; F27B 7/34; F27D 2099/0051
See application file for complete search history.

(56) References Cited

U.S. PATENT DOCUMENTS 6,315,551 B1 * 11/2001 Salzsieder ............... F23D 14/24
239/400
2010/0162930 A1 * 7/2010 Okazaki .................. F23C 7/008
110/190
(Continued)

FOREIGN PATENT DOCUMENTS

GN    201106847 Y    8/2008
JP    2001-012705 A    1/2001
(Continued)

OTHER PUBLICATIONS

International Search Report for PCT Application No. PCT/JP2018/035775, dated Nov. 27, 2018 in 3 pages.
(Continued)

*Primary Examiner* — Alfred Basichas
(74) *Attorney, Agent, or Firm* — Knobbe, Martens, Olson & Bear, LLP

(57) ABSTRACT

A cement kiln burner device includes a powdered-solid-fuel flow channel having means for swirling a powdered-solid-fuel flow; a first air flow channel placed outside the powdered-solid-fuel flow channel having means for swirling an air flow; a second air flow channel placed outside the first air flow channel having means for straightly forwarding an air flow; a third air flow channel placed inside the powdered-solid-fuel flow channel having means for swirling an air flow; and a combustible-solid-waste flow channel placed inside the third air flow channel. The second air flow channel includes an opening portion forming a port for injecting an air flow, and a closed portion covered for preventing an air flow from passing therethrough. The opening portion and the closed portion are alternately arranged in a circumferential direction.

18 Claims, 5 Drawing Sheets

(51) Int. Cl.
*F23D 1/00* (2006.01)
*C04B 7/44* (2006.01)
*F23G 5/20* (2006.01)

(56) References Cited

U.S. PATENT DOCUMENTS

| 2014/0356794 | A1* | 12/2014 | Hagstrom | F23D 1/005 |
| | | | | 431/12 |
| 2016/0008830 | A1* | 1/2016 | Yamamoto | B05B 7/205 |
| | | | | 239/79 |
| 2018/0142887 | A1* | 5/2018 | Kiyama | F23D 1/00 |

FOREIGN PATENT DOCUMENTS

| JP | 2003-279003 A | 10/2003 |
| JP | 2013-237571 A | 11/2013 |
| JP | 2015-190731 A | 11/2015 |
| WO | 2009/034626 A1 | 3/2009 |
| WO | 2014/014065 A1 | 1/2014 |

OTHER PUBLICATIONS

Japanese Office Action for Application No. 2019-534763, dated Apr. 3, 2020 in 10 pages. (English Translation included).
Chinese Office Action issued for Chinese Patent Application No. 201880048409.7, dated Jun. 17, 2021 in 12 pages including English translation.

* cited by examiner

CEMENT KILN BURNER DEVICE AND METHOD FOR OPERATING THE SAME

CROSS-REFERENCE TO RELATED APPLICATIONS

This application is the U.S. National Phase under 35. U.S.C. § 371 of International Application PCT/JP2018/035775, filed Sep. 26, 2018. The disclosure of which including the specification, the drawings, and the claims is hereby incorporated by reference in its entirety.

TECHNICAL FIELD

The present invention relates to a cement kiln burner device, particularly to a cement kiln burner device capable of utilizing combustible solid wastes as supplemental fuels in calcinations for cement clinkers. Further, the present invention relates to a method for operating such a cement kiln burner device.

BACKGROUND ART

Combustible solid wastes, such as waste plastics, wood chips, automobile shredder residues (ASR), have heat quantities enough to use such combustible solid wastes as calcination fuels. Therefore, there has been promotion of effective utilization of combustible solid wastes as alternative fuels substituted for pulverized coals, which are main fuels, in rotary kilns for use in cement clinker calcinations. Hereinafter, such rotary kilns for use in cement clinker calcinations will be referred to as "cement kilns".

Conventionally, in fuel recycling of combustible solid wastes with cement kilns, combustible solid wastes have been used in calcining furnaces installed at kiln tail portions, which exert less influences on cement clinkers. However, such calcining furnaces have been nearly saturated with combustible solid wastes used therein in amount. Therefore, there have been requirements for techniques for using combustible solid wastes in main burners installed at kiln front portions.

However, use of combustible solid wastes as supplemental fuels in main burners of cement kilns may cause phenomena (which will be referred to as "landing combustion") in which combustible solid wastes ejected from main burners are continuously combusted even after having landed on cement clinkers in the cement kilns. If such landing combustion occurs, this induces reducing calcination of cement clinkers around the positions where the combustible solid wastes have landed, which induces whitening of cement clinkers, and abnormal clinkering reactions.

In order to prevent landing combustion of combustible solid wastes, there have been required techniques for maintaining a combustible solid waste at a floating state in a cement kiln for a longer time period and completing combustion of the combustible solid waste maintained at the floating state, or techniques for causing a combustible solid waste to land at farther positions (near the kiln tail) within a cement kiln and completing combustion of the combustible solid waste before clinker raw materials reach a clinkering main reaction area.

For example, the following Patent Document 1 discloses a cement kiln provided with a main fuel burner for ejecting pulverized coal as a main fuel, and an auxiliary burner for injecting a combustible solid waste, as a technique for combusting a major part of a combustible solid waste in a floating state. In the cement kiln, primary air from the main fuel burner is supplied in such a way as to swirl in one direction when viewed in the axis direction from the kiln front side of the cement kiln main body, and the auxiliary burner is placed outside the main fuel burner within the range from the top portion (0 degree) of the main fuel burner to 55 degrees in the opposite direction from the aforementioned one direction about the axis, with respect to a vertical straight line passing through the aforementioned axis.

PRIOR ART DOCUMENT

Patent Document

Patent Document 1: JP-A-2013-237571

SUMMARY OF THE INVENTION

Problems to be Solved by the Invention

However, the method in Patent Document 1 is insufficient in effect of maintaining combustible solid wastes at floating states, which restricts combustible solid wastes adaptable thereto to those with smaller bulk specific gravities, such as waste plastics. Further, this method in Patent Document 1 has the problem of difficulty in completely combusting even waste plastics having sizes with outer diameters more than 15 mm while maintaining them at floating states. Namely, the method in Patent Document 1 imposes a large restriction on combustible solid wastes usable therein, in terms of bulk specific gravity and size.

In view of the aforementioned problems, it is an object of the present invention to provide a cement kiln burner device capable of intensively bringing a combustible solid waste into a floating state within a cement kiln and easily causing ignition of the combustible solid waste in the floating state, and a method for operating the same.

Means for Solving the Problems

The present inventors have conducted earnest studies about a method for injecting a combustible solid waste from a main burner, in such a way as to intensively bring the combustible solid waste into a floating state within a cement kiln and to easily cause ignition of the combustible solid waste in the floating state. As a result, they have found that the aforementioned problem can be solved by intermittently ejecting straight flows from a channel positioned in the outermost side, in a 4-channel type burner including three flow channels for primary air, in addition to a single flow channel for fuel flows (air flows containing pulverized coal), as injection ports in a main burner.

Namely, a cement kiln burner device according to the present invention is a cement kiln burner device including a plurality of flow channels partitioned by a plurality of concentric cylindrical members, the cement kiln burner device including:

a powdered-solid-fuel flow channel including means for swirling a powdered solid fuel flow;

a first air flow channel (first swirl outer flows) placed outside the powdered-solid-fuel flow channel to be adjacent to the powdered-solid-fuel flow channel, the first air flow channel including means for swirling an air flow;

a second air flow channel (first straight outer flows) placed outside the first air flow channel to be adjacent to the first air flow channel, the second air flow channel including means for straightly forwarding an air flow;

a third air flow channel (first swirl inner flows) placed inside the powdered-solid-fuel flow channel to be adjacent to the powdered-solid-fuel flow channel, the third air flow channel including means for swirling an air flow; and a combustible-solid-waste flow channel placed inside the third air flow channel, in which the second air flow channel includes an opening portion forming a port for injecting an air flow, and a closed portion covered for preventing an air flow from passing therethrough, and the opening portion and the closed portion are alternately arranged in a circumferential direction.

Further, the powdered-solid-fuel flow channel, the first air flow channel, the second air flow channel, the third air flow channel and the combustible-solid-waste flow channel are each extended up to the tip end surface of the cement kiln burner device.

Namely, the cement kiln burner device having the aforementioned structure includes two air flow channels (first swirl outer flows and first straight outer flows) in an outer side, with the powdered-solid-fuel flow channel sandwiched therebetween, and one air flow channel (first swirl inner flows) in an inner side. It is possible to easily perform adjustments for providing optimum flame, depending on the types of the powdered solid fuel and the combustible solid waste which are used therein, and the like, by adjusting the amounts of air flowing through these three air flow channels, independently of each other.

As described above, in the second air flow channel for forming first straight outer flows, the opening portion and the closed portion are alternately arranged in the circumferential direction. As a result, the opening portions forming injection ports are intermittently placed, so that first straight outer flows injected from the burner injection ports are substantially formed to be a bundle of several straight outer flows (which is referred to as "a straight outer flow bundle" herein). This increases the degree and range of turbulence of air flows ejected from the burner, which enables rapidly introducing, into burner flame, a larger amount of secondary air, which is high-temperature air supplied into the cement kiln from a clinker cooler. This allows to combust the combustible solid waste in a floating state.

Preferably, an opening-portion rate, which is a ratio of a total area of the opening portion on an entire area of the second air flow channel when the second air flow channel is taken along a plane orthogonal to an axis center, is equal to or more than 20 area % and less than 80 area %, with respect to the entire area corresponding to 100 area %.

If the opening-portion rate is made too small, it is not possible to ensure a sufficient flow rate of air flows supplied to the burner as first straight outer flows. On the other hand, if the opening-portion rate is made too large, the interval between a single straight outer flow forming the straight outer flow bundle and another straight outer flow adjacent thereto is made too small, in comparison with the diameter of a single straight outer flow. This may result in insufficient exertion of the aforementioned function of enhancing turbulent flows.

In view of these circumstances, with respect to the entire area corresponding to 100 area %, the opening-portion rate is preferably equal to or more than 20 area % and less than 80 area %, more preferably equal to or more than 20 area % and less than 70 area % and, furthermore preferably equal to or more than 20 area % and less than 60 area %.

A plurality of the opening portions and a plurality of the closed portions may be placed at positions which are rotationally symmetric about the axis center of the second air flow channel, particularly when the opening-portion rate is equal to or more than 40 area %. Further, the plurality of opening portions and the plurality of closed portions may be placed at positions which are line-symmetric with respect to a vertical straight line passing through the axis center, in a plane orthogonal to the axis center of the second air flow channel.

When the opening-portion rate is equal to or more than 20 area % and less than 40 area %, 60 area % or more of the plurality of opening portions may be placed in the vertically-lower side with respect to a plane which includes the axis center of the second air flow channel and is parallel to the axial direction of the concentric cylindrical members. By placing 60 area % or more of the opening portions in the vertically-lower side, it is possible to cause the straight outer flow bundle to form ascending air flows in burner flame, and to maintain the combustible solid waste at a floating state for a long time period.

Preferably, the cement kiln burner device further includes means for straightly forwarding a combustible-solid-waste flow ejected from the combustible-solid-waste flow channel.

With this structure, it is possible to sufficiently mix the combustible-solid-waste flow with the primary air ejected from the respective flow channels and with the secondary air. This enables rapidly attaining a high-temperature environment, while supplying a sufficient amount of oxygen to peripheries of the combustible solid waste being in a floating state, thereby promptly completing the combustion of the combustible solid waste.

Further, according to the present invention, there is provided a method for operating the cement kiln burner device, in which a flow velocity at a burner tip in the second air flow channel (first straight outer flows) is 100 m/s to 400 m/s. In this case, it is preferable that the ratio of the amount of primary air to the theoretical amount of combustion air ($A_0$ ratio: which will be referred to as "a primary air ratio" hereinafter) from the second air flow channel is 2 vol % to 11 vol %.

In the method for operating the cement kiln burner device, a powdered-solid-fuel flow from the powdered-solid-fuel flow channel may have a swirl angle of 0 degree to 15 degrees at a burner tip. Further, the air flow from the first air flow channel (first swirl outer flows) can have a swirl angle of 1 degree to 50 degrees at the burner tip. Further, the air flow from the third air flow channel (first swirl inner flows) can have a swirl angle of 30 degrees to 50 degrees at the burner tip. Through these swirl air flows, it is possible to ensure stability of ignition of the powdered solid fuel, the combustible solid waste and the like, and furthermore it is possible to create internal circulations of air flows within burner flame, in order to cause flame at the burner tip portion to have flame stabilizing functions.

Further, in the method for operating the cement kiln burner device, a flow velocity at the burner tip in the first air flow channel (first swirl outer flows) may be 60 m/s to 240 m/s, and the primary air ratio (the $A_0$ ratio) from the first air flow channel may be 1 vol % to 5 vol %. Further, a flow velocity at the burner tip in the third air flow channel (first swirl inner flows) may be 5 m/s to 240 m/s, and the primary air ratio (the $A_0$ ratio) from the third air flow channel may be 1 vol % to 5 vol %. Further, the powdered-solid-fuel flow may have a flow velocity of 30 m/s to 80 m/s at the burner tip in the powdered-solid-fuel flow channel, and the combustible-solid-waste flow may also have a flow velocity of 30 m/s to 80 m/s at the burner tip in the combustible-solid-waste flow channel.

Further, in the method for operating the cement kiln burner device, a combustible solid waste ejected from the combustible-solid-waste flow channel may have a particle size of 30 mm or less.

Effect of the Invention

With the cement kiln burner device according to the present invention, and with the method for operating the cement kiln burner device according to the present invention, it is possible to effectively utilize combustible solid wastes such as waste plastic pieces as supplemental fuels without causing landing combustion thereof.

MODE FOR CARRYING OUT THE INVENTION

Figure 1:
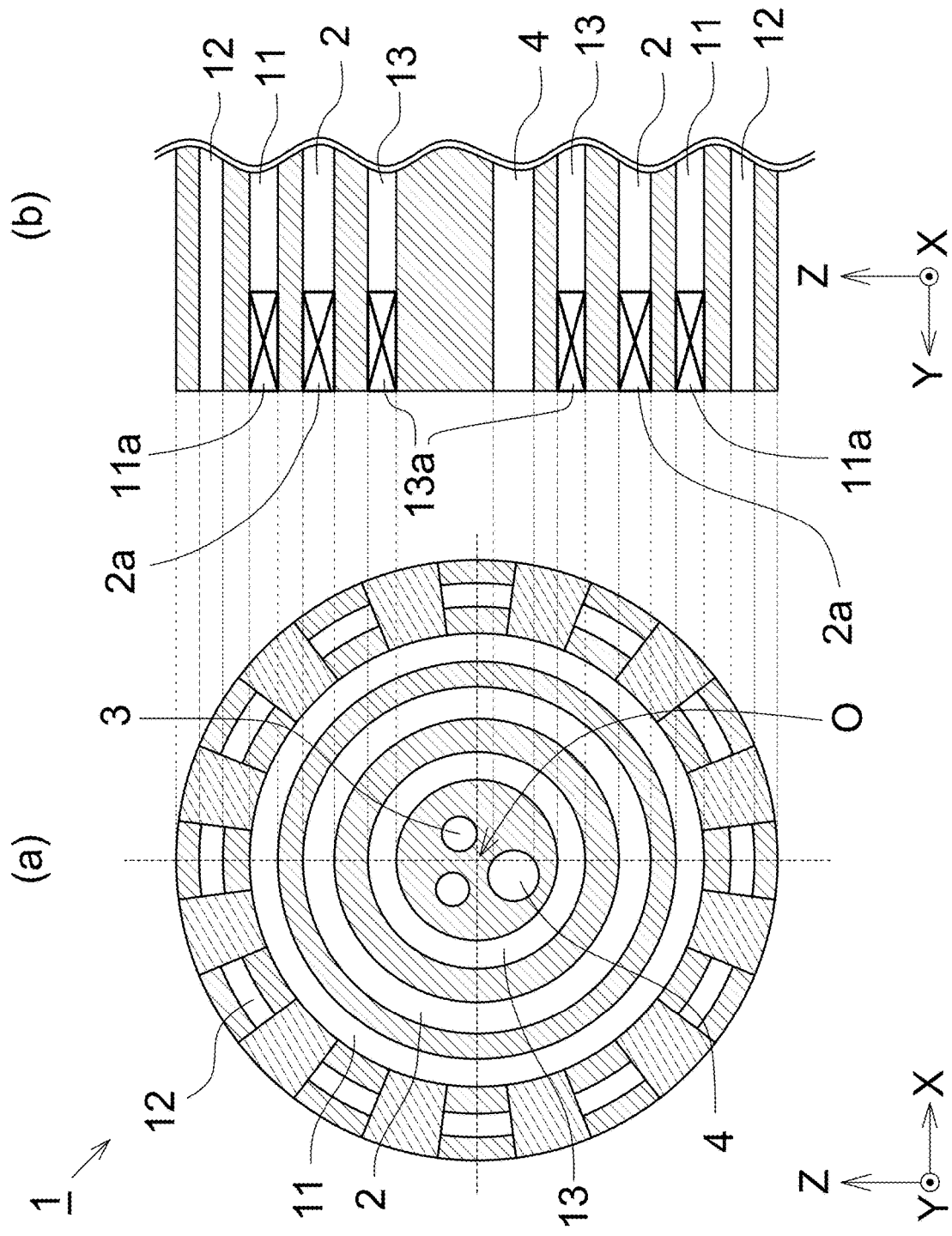
FIG. 1 is a view schematically illustrating a cement kiln burner device according to the present invention, in an embodiment, at its tip-end portion.

Hereinafter, there will be described embodiments of a cement kiln burner device and a method for operating the same, according to the present invention, with reference to the drawings. Incidentally, the drawings which will be described later are schematically illustrated, and dimension ratios in the drawings are not coincident with the actual dimension ratios.

FIG. 1 is a view schematically illustrating a cement kiln burner device according to the present invention, in an embodiment, at its tip-end portion. In FIG. 1, (a) is a lateral cross-sectional view of the cement kiln burner device, and (b) is a longitudinal cross-sectional view of the same. Further, the lateral cross-sectional view refers to a cross-sectional view of the cement kiln burner device taken along a plane orthogonal to the axial direction of the same device. The longitudinal cross-sectional view refers to a cross-sectional view of the cement kiln burner device taken along a plane parallel to the axial direction of the same device.

Further, in FIG. 1, there is defined a coordinate system, by defining the axial direction of the cement kiln burner device (namely, the direction of air flows) as a Y direction, by defining the vertical direction as a Z direction, and by defining the direction orthogonal to a YZ plane as an X direction. Hereinafter, descriptions will be given by making reference to this XYZ coordinate system. By using this XYZ coordinate system, FIG. 1(a) corresponds to a cross-sectional view of the cement kiln burner device, taken along an XZ plane, and FIG. 1(b) corresponds to a cross-sectional view of the cement kiln burner device, taken along a YZ plane. More specifically, FIG. 1(b) corresponds to a cross-sectional view of the cement kiln burner device, taken along a YZ plane, at a position near the burner tip.

As illustrated in FIG. 1, the cement kiln burner device 1 includes plural flow channels in a concentric manner. More specifically, the cement kiln burner device 1 includes a total of four flow channels, which are a powdered-solid-fuel flow channel 2, a first air flow channel 11 placed outside the powdered-solid-fuel flow channel 2 to be adjacent thereto, a second air flow channel 12 placed outside the first air flow channel 11 to be adjacent thereto, and a third air flow channel 13 placed inside the powdered-solid-fuel flow channel 2 to be adjacent thereto. Further, an oil flow channel 3, a combustible-solid-waste flow channel 4 and the like are placed inside the third air flow channel 13.

In the powdered-solid-fuel flow channel 2, the first air flow channel 11 and the third air flow channel 13, out of the powdered-solid-fuel flow channel 2 and the first to third air flow channels 11 to 13, swirl vanes (2a, 11a, 13a) as respective swirl means are secured to the burner tip-end portions in the respective flow channels (see FIG. 1(b)). Namely, air flows ejected from the first air flow channel 11 form swirl air flows (which will be properly referred to as "first swirl outer flows", hereinafter) positioned outside powdered-solid-fuel flows ejected from the powdered-solid-fuel flow channel 2. Air flows ejected from the third air flow channel 13 form swirl air flows (which will be properly referred to as "first swirl inner flows", hereinafter) positioned inside powdered-solid-fuel flows ejected from the powdered-solid-fuel flow channel 2. Further, the respective swirl vanes (2a, 11a, 13a) are adjustable in swirl angle, at the time point before the start of operation of the cement kiln burner device 1.

On the other hand, no swirl means is provided in the second air flow channel 12. Namely, air flows ejected from the second air flow channel 12 form straight air flows (which will be properly referred to as "first straight outer flows", hereinafter) positioned outside powdered-solid-fuel flows ejected from the powdered-solid-fuel flow channel 2. This will be described with reference to FIG. 2, which schematically illustrates only the second air flow channel 12 extracted from FIG. 1.

Figure 2:
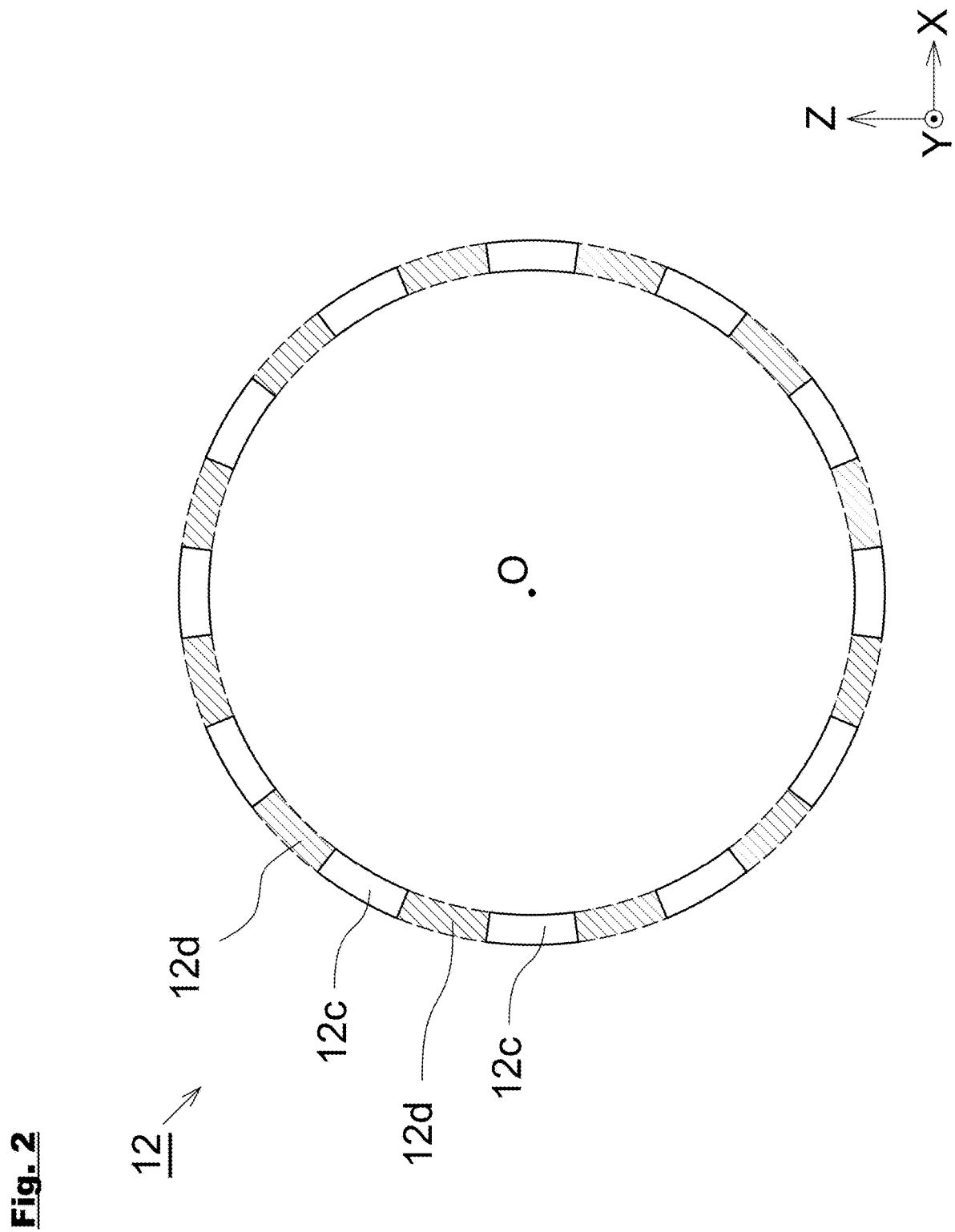
FIG. 2 is a view schematically illustrating a second air flow channel extracted from FIG. 1.

In the present embodiment, the second air flow channel 12 is configured to eject intermittent straight air flows. More specifically, as illustrated in FIG. 2, the second air flow channel 12 is constituted by opening portions 12c forming ports for injecting air flows, and closed portions 12d covered for preventing air flows from passing therethrough, which are alternately arranged in the circumferential direction. Thus, the opening portions 12c are placed intermittently in the circumferential direction, so that these opening portions 12c eject straight air flows which are intermittent in the circumferential direction.

In the present embodiment, the opening portions 12c and the closed portions 12d are placed at positions which are rotationally symmetric about the axis center O. Further, in the example of FIGS. 1 and 2, there is illustrated a case where the center angle of the opening portions 12c is equal to the center angle of the closed portions 12d. In this case, when the second air flow channel 12 is taken along a plane (an XZ plane) orthogonal to the axis center O extending in the Y direction, the ratio of the total area of the opening portions 12c to the entire area ((the total area of the opening portions 12c+the total area of the closed portions 12d): 100 area %), namely the opening-portion rate in the second air flow channel 12, is 50 area %.

Figure 3:
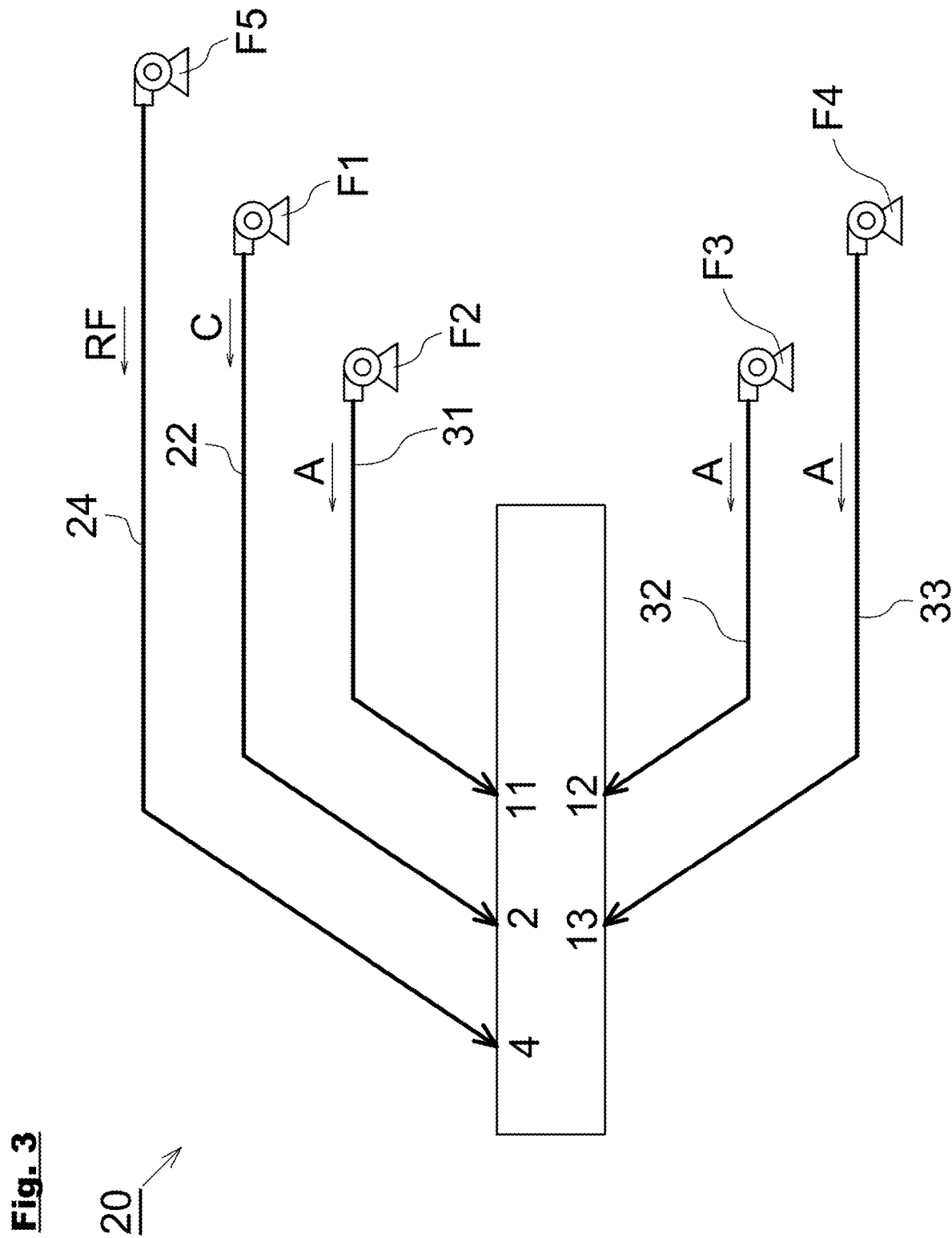
FIG. 3 is a view schematically illustrating an example of the structure of a cement kiln burner system including the cement kiln burner device illustrated in FIG. 1.

FIG. 3 is a view schematically illustrating an example of the structure of a cement kiln burner system including the cement kiln burner device 1 illustrated in FIG. 1. The cement kiln burner system 20 illustrated in FIG. 3 is structured in such a way as to place importance on facilitating the control, and this cement kiln burner system 20 includes five blowing fans F1 to F5.

A pulverized coal C (corresponding to "a powdered solid fuel") supplied to a pulverized-coal transfer pipe 22 is supplied to the powdered-solid-fuel flow channel 2 in the cement kiln burner device 1, through air flows formed by the blowing fan F1. Air supplied from the blowing fan F2 is supplied, as combustion air A, to the first air flow channel 11 in the cement kiln burner device 1, through an air pipe 31. Air supplied from the blowing fan F3 is supplied, as combustion air A, to the second air flow channel 12 in the cement kiln burner device 1, through an air pipe 32. Air supplied from the blowing fan F4 is supplied, as combustion air A, to the third air flow channel 13 in the cement kiln burner device 1, through an air pipe 33. A combustible solid waste RF supplied to a combustible-solid-waste transfer pipe 24 is supplied to the combustible-solid-waste flow channel 4 in the cement kiln burner device 1, through air flows formed by the blowing fan F5.

The cement kiln burner system 20 illustrated in FIG. 3 is capable of controlling the amount of air flowing through each of the flow channels (2, 4, 11, 12, 13), independently, through the blowing fans (F1 to F5). This enables easily performing adjustments for providing optimum flame suitable for the type of the powdered solid fuel such as pulverized coal, petroleum coke or other solid fuels, the type of the combustible solid waste such as waste plastic, meat-and-bone meals or biomasses, and various cement-kiln operating environments.

Incidentally, in the present specification, the term "biomass" refers to organic resources (except fossil fuels) derived from living things, which are usable as fuels and the like. For example, the term "biomass" corresponds to shredded waste tatamis, shredded waste construction woods, wood chips, saw dusts and the like.

Further, heavy oil or the like can be also supplied, through the oil flow channel 3, for being used in ignition in the cement kiln burner device 1. Also, a solid fuel other than pulverized coal or a liquid fuel such as heavy oil can be supplied thereto, for being used in mixed combustion together with pulverized coal, during normal operation (not illustrated).

Namely, the cement kiln burner device 1 (and the cement kiln burner system 20) according to the present invention, an embodiment of which is illustrated in FIGS. 1 to 3, is a 4-channel type burner device including the three air flow channels (11, 12, 13), in addition to the powdered-solid-fuel flow channel 2. Further, during use of the cement kiln burner device 1, the amounts of air flowing through the respective flow channels (2, 4, 11, 12, 13) can be controlled, by controlling operation of the five blowing fans (F1 to F5).

Further, in addition thereto, before use of the cement kiln burner device 1, the swirl vanes (2a, 11a, 13a) provided in the powdered-solid-fuel flow channel 2, the first air flow channel 11 and the third air flow channel 13 can be adjusted in swirl angle. Therefore, it is possible to perform control in various manners as required.

The present inventors found basic limitation regions for optimizing control factors, by conducting analyses about flame shapes, temperature distributions within cement kilns, oxygen concentration distributions within cement kilns, degrees of turbulences of air flows within cement kilns, and the like, through combustion simulations (software: FLUENT manufactured by ANSYS JAPAN K.K.) for the cement kiln burner device 1.

The following Table 1 represents examples of basic limitation regions found under the following burner combustion conditions.

<Burner Combustion Conditions>

The amount of pulverized coal C combusted: 15 t/hour

The amount of waste plastic (non-rigid plastic) as combustible solid waste RF which was processed: 3 t/hour The size of waste plastic as combustible solid waste RF: a circular sheet shape with a diameter of 30 mm which was formed by punching a sheet with a thickness of 0.5 mm The amount and the temperature of secondary air: 150000 Nm3/hour, 800 degrees C.

The diameter of the burner tip in the cement kiln burner device 1: 700 mm

TABLE 1

|  | Flow channel number (Fig. 1) | Burner-tip flow velocity (m/s) | Primary air ratio (volume %) | Opening-portion rate (area %) | Swirl angle (degree) |
| --- | --- | --- | --- | --- | --- |
| Powdered solid fuel flow | 2 | 30~80 | 2~6 | 100 | 0~15 |
| First swirl outer flow | 11 | 60~240 | 1~5 | 100 | 1~50 |
| First straight outer flow | 12 | 100~400 | 2~11 | 20~80 | 0 |
| First swirl inner flow | 13 | 5~240 | 1~5 | 100 | 30~50 |
| Combustible solid waste flow | 4 | 30~80 | 2~6 | 100 | 0 |

Table 1 enumerates, as basic limitation regions, the flow velocity (m/s) at the burner tip, the primary-air ratio ($A_O$ ratio, volume %), the opening-portion rate (area %), and the swirl angles of the swirl vanes (2a, 11a, 13a), in the aforementioned powdered-solid-fuel flow channel 2, the first air flow channel 11 (for forming first swirl outer flows), the second air flow channel 12 (for forming first straight outer flows), the third air flow channel 13 (for forming first swirl inner flows), and the combustible-solid-waste flow channel 4.

Among the aforementioned respective items, the burner-tip flow velocity (m/s) and the opening-portion rate (area %) for first straight outer flows are important in particular. This is because of the following reason. That is, in order to combust the combustible solid waste maintained at a floating state, it is necessary to sufficiently form an area within which air flows form turbulent flows within flame. By making first straight outer flows be spatially-intermittent flows, it is possible to form turbulent flows with higher intensity in flame, to such an extent as to impose no influence on the calcination for cement clinker. Furthermore, by increasing the velocity of these first straight outer flows, it is possible to further increase the degree of turbulent flows and the range of formation of turbulent flows. However, if the degree of such turbulent flows is excessive, this may destabilize a temperature distribution within the cement kiln and, furthermore, may bring a portion of flame into direct contact with the cement-clinker raw materials, thereby degrading the quality of the produced cement clinker.

In view of the aforementioned circumstances, it is preferable that air flows (first straight outer flows) supplied from the second air flow channel 12 have burner-tip flow velocities of 100 m/s to 400 m/s. These air flows have a largest flow velocity, out of those of the powdered-solid-fuel flows, the combustible-solid-waste flows and all the other primary air flows. Further, the amount of primary air (mN/min) in the first straight outer flows is such an amount of primary air (mN/min) that the product of the value of this amount of primary air and the burner-tip flow velocity (m/s) (the burner-tip flow velocity (m/s)×the amount of primary air (mN/min)) is largest, out of those of the powdered-solid-fuel flows, the combustible-solid-waste flows and all the other primary air flows.

Regarding air flows supplied from the second air flow channel 12, if the value of the aforementioned product, namely the value of the burner-tip flow velocity (m/s)×the amount of primary air ($m^3$N/min), is smaller than those of the other air flows, this may cause insufficient formation of turbulent flows, in view of intensively bringing the combustible solid waste into a floating state. Further, if these air flows have burner-tip flow velocities exceeding 400 m/s, this may induce excessive formation of turbulent flows in flame, thereby degrading the quality of the aforementioned cement clinker.

Further, it is preferable that the opening-portion rate in the second air flow channel 12 for supplying first straight outer flows is equal to or more than 20 area % and less 80 area %, and it is more preferable that the opening portions and the closed portions are continuously adjacent to each other to form intermittent injection ports. By intermittently placing the injection ports in the second air flow channel 12, it is possible to supply air flows from the second air flow channel 12, as a bundle of several straight outer flows. This results in formation of portions with higher and lower air densities within flame, thereby causing turbulent flows in such a way as to eliminate these density differences.

If the opening-portion rate in the second air flow channel 12 is larger than 80 area %, this reduces the effect of forming turbulent flows, which tends to cause landing combustion of the combustible solid waste. Further, if the opening-portion rate in the second air flow channel 12 is less than 20 area %, this causes excessive and local turbulence in flame shape, which may degrade the quality of the aforementioned cement clinker.

A next most important basic limitation region is the swirl angles (degrees) in the aforementioned powdered-solid-fuel flow channel 2, the first air flow channel 11 (for forming first swirl outer flows), and the third air flow channel 13 (for forming first swirl inner flows). This is because of the following reason. That is, swirl flows generated by the swirl vanes (2a, 11a, 13a) can stabilize ignition in the burner device and, furthermore, can create internal circulations of air flows in burner flame, which provides flame stabilizing functions. Further, the swirl angles of the swirl vanes (2a, 11a, 13a) are fixed during operation of the burner device, in general, and cannot be adjusted for optimization during operation.

Figure 4:
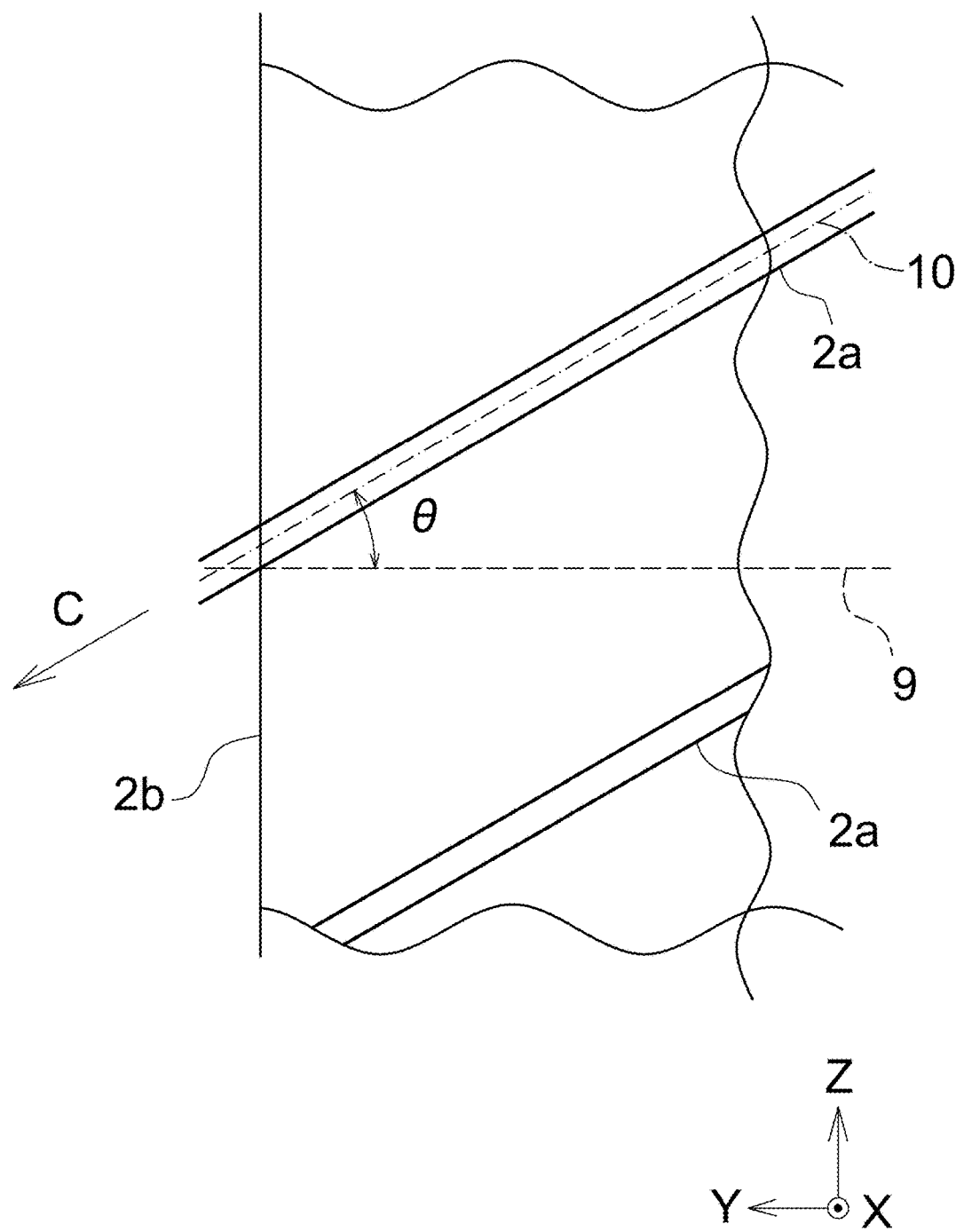
FIG. 4 is a schematic view for explaining the swirl angles of swirl vanes in the cement kiln burner device 1.

When the cylindrical member to which the swirl vane illustrated in FIG. 1 is secured is developed in a plane as illustrated in FIG. 4, for example, the swirl angle of this swirl vane is the angle θ formed between the axis 9 of the cement kiln burner device 1 and the center line 10 of the swirl vane. The swirl angle of this swirl vane is coincident with the swirl angle of powdered-solid-fuel flows or primary air flows at the burner tip. In FIG. 4, as an example, there is illustrated the swirl vane 2a in the powdered-solid-fuel flow channel 2, in which the direction of ejection of the pulverized coal C (the powdered solid fuel) at the tip end position 2b in the powdered-solid-fuel flow channel 2 is rotated by the angle θ with respect to the direction of the axis 9 of the cylindrical member (the Y direction in the figure). The swirl angles of the other swirl vanes (11a, 13a) can be also defined similarly.

The swirl angle of powdered-solid-fuel flows caused by the swirl vane 2a in the aforementioned powdered-solid-fuel flow channel 2 is preferably set to be 0 degree to 15 degrees. If this swirl angle is larger than 15 degrees, this induces sufficiently excessive mixture of the powdered solid fuel (pulverized coal C) ejected from the powdered-solid-fuel flow channel 2, with the aforementioned secondary air introduced in the powdered-solid-fuel flow channel 2, the air flow channels (11 to 13) and flame. This may raise the temperature of flame formed by the powdered solid fuel and, further, may cause excessive difficulty in controlling the shape of flame, which may degrade the quality of the resultant cement clinker.

Further, the swirl angle of first swirl outer flows (air flows from the first air flow channel 11) caused by the swirl vane 11a is preferably set to be 1 degree to 50 degrees. If the swirl angle of first swirl outer flows is less than 1 degree, this induces insufficient mixture of the powdered solid fuel ejected from the powdered-solid-fuel flow channel 2 with the first swirl outer flows. This may degrade the quality of the produced cement clinker or may cause difficulty in sufficiently reducing NOx in the exhaust gas. On the other hand, if the aforementioned swirl angle exceeds 50 degrees, this induces too intense mixture thereof with powdered-solid-fuel flows, which may cause difficulty in controlling the shape of flame, thereby degrading the quality of the produced cement clinker.

The swirl angle of first swirl inner flows (air flows from the third air flow channel 13) caused by the swirl vane 13a is preferably set to be 30 degrees to 50 degrees. If the swirl angle of the first swirl inner flows is less than 30 degrees, this induces insufficient mixture of the powdered solid fuel ejected from the powdered-solid-fuel flow channel 2 with the first swirl inner flows. This may degrade the quality of the produced cement clinker or may cause difficulty in sufficiently reducing NOx in the exhaust gas. On the other hand, if the aforementioned swirl angle exceeds 50 degrees, this induces too intense mixture thereof with powdered-solid-fuel flows, which may cause difficulty in controlling the shape of flame, thereby degrading the quality of the produced cement clinker.

In view of stably forming reduction areas in flame, it is preferable to lower the amounts of primary air ($m^3$N/min) in the respective air flow channels (2, 4, 11, 12, 13), as much as possible. However, if the amounts of primary air are excessively lowered, this changes the shape of flame, which shifts high-temperature areas to the inside of the cement kiln, thereby degrading the quality of the produced cement clinker. In the examples represented in Table 1, air flows from the powdered-solid-fuel flow channel 2 and the combustible-solid-waste flow channel 4, and first straight outer flows (air flows from the second air flow channel 12) are made larger, in amount (amount of primary air), than the other air flows. This is for smoothly introducing the secondary air at a higher temperature into flame for rapidly raising the temperatures of the pulverized coal C (the powdered solid fuel) and the combustible solid waste RF, in order to facilitate discharge of volatile components for stabilizing flame reduction states.

As described above, according to the present invention, it is possible to optimize conditions for operation of the cement kiln burner device 1 in a shorter time, by setting the swirl angles of the respective swirl vanes (2a, 11a, 13a) in the powdered-solid-fuel flow channel 2, the first air flow channel 11 (first swirl outer flows) and the third air flow channel 13 (first swirl inner flows) within the ranges illustrated in FIG. 1 before operation of the cement kiln burner device 1, and, further, by setting the burner-tip flow velocities and the amounts of primary air in the respective air flow channels (2, 11, 12, 13) within the ranges illustrated in Table 1 through adjustments of the amounts of primary air flowing through the air pipes (22, 31, 32, 33) by the blowing fans (F1, F2, F3, F4), during operation of the cement kiln burner device 1.

Next, there will be described combustion simulations regarding the rate of landing combustion (the kiln inside falling rate) of combustible solid waste RF (in this case, non-rigid plastic), in cases of varying the burner-tip flow velocity (m/s) and the opening-portion rate (area %) for first straight outer flows (air flows from the second air flow channel 12).

(Investigation 1)

More specifically, investigations were conducted through simulations (software: FLUENT manufactured by ANSYS JAPAN K.K.), in cases of varying the burner-tip flow velocity (m/s) while fixing burner combustion conditions as will be described later and, further, fixing the primary air ratio (the $A_0$ ratio) of first straight outer flows to 5 vol %, in order to determine whether non-rigid plastic with a particle size of 30 mm was burned out within flame or in landing combustion, in cases where the injection port in the second air flow channel 12 was divided into intermittent 12 sections similarly to in FIG. 1(a) (examples) and in cases where the injection port in the second air flow channel 12 was not divided (comparative examples). Further, in cases of varying the opening-portion rate (area %) of the second air flow channel 12, the thickness of the second air flow channel 12 was varied, in such a way as to equalize the amount of primary air ($m^3$N/min), in order to prevent the primary-air ratio (the $A_0$ ratio) from being changed.

<Burner Combustion Conditions>

The amount of pulverized coal C combusted: 15 t/hour

The amount of waste plastic (non-rigid plastic) as combustible solid waste RF which was processed: 3 t/hour The size of waste plastic as combustible solid waste RF: a circular sheet shape with a diameter of 30 mm which was formed by punching a sheet with a thickness of 0.5 mm The burner-tip flow velocity, the primary air ratio and the swirl angle of powdered-solid-fuel flows: 50 m/s, 5 vol %, 5 degrees The burner-tip flow velocity, the primary air ratio and the swirl angle of first swirl outer flows: 100 m/s, 2 vol %, 3 degrees The burner-tip flow velocity, the primary air ratio and the swirl angle of first swirl inner flows: 150 m/s, 7 vol %, 4 degrees The burner-tip flow velocity and the primary air ratio of combustible-solid-waste flows: 50 m/s, 2 vol %

The amount and the temperature of secondary air: 150000 $Nm^3$/hour, 800 degrees C.

The diameter of the burner tip in the cement kiln burner device 1: 700 mm

Figure 5:
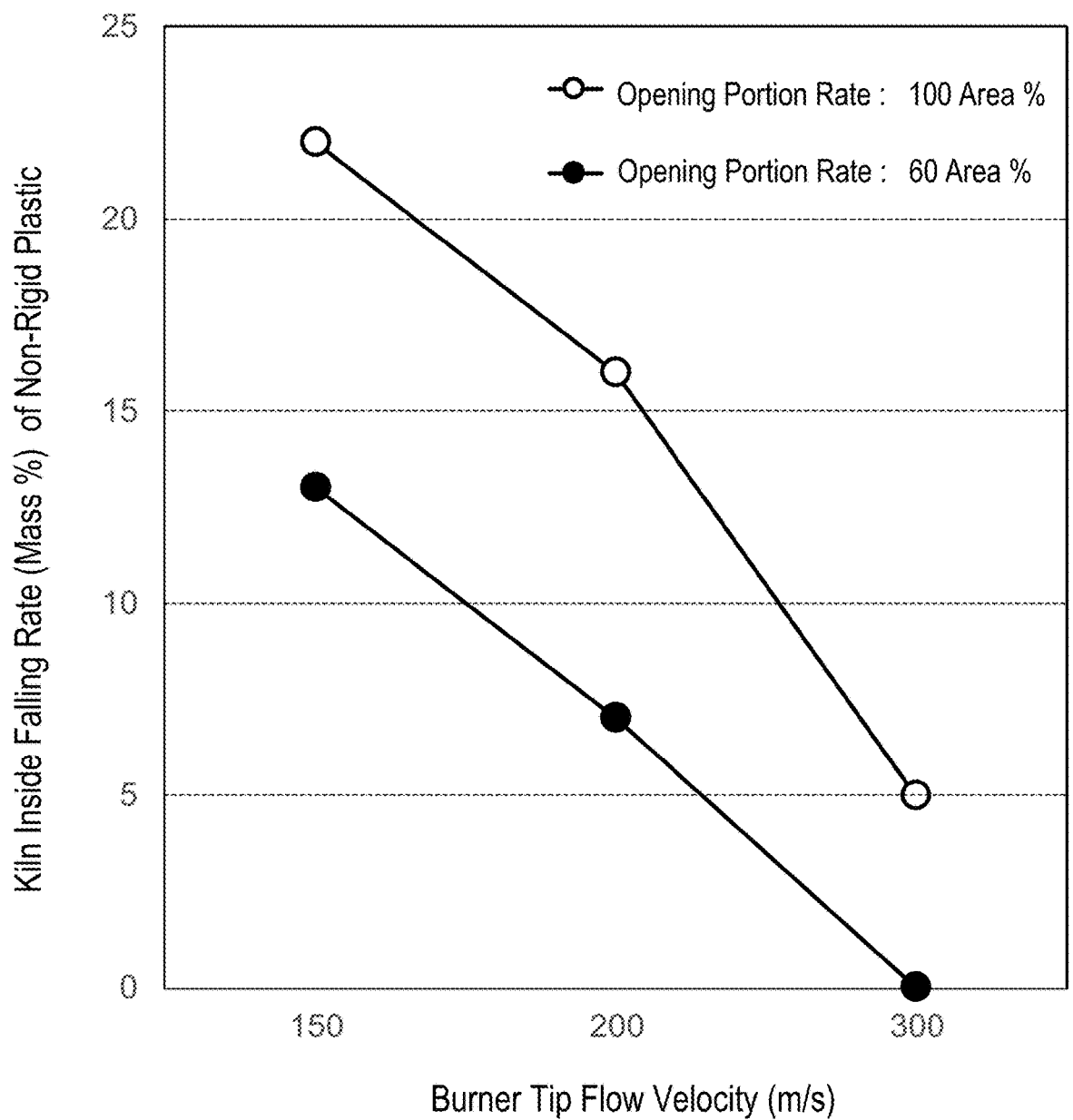
FIG. 5 is a graph illustrating results of combustion simulations regarding the rate of landing combustion of combustible solid waste (the kiln inside falling rate), according to the cement kiln burner device and the method for operating the cement kiln burner device according to the present invention.

The following Table 2 and FIG. 5 illustrate the results of the simulations.

TABLE 2

| Kiln inside falling rate (mass %) of non-rigid plastic | | |
| --- | --- | --- |
| Burner-tip flow | Opening-portion rate (area %) | |
| velocity (m/s) of first straight outer flow | 60% (Example) | 100% (Comparative Example) |
| 150 | 13 | 22 |
| 200 | 7 | 16 |
| 300 | 0 | 5 |

The results in Table 2 and FIG. 5 reveal that, it was possible to provide an effect of lowering the kiln inside falling rate of the combustible solid waste RF with a particle size of 30 mm or less, by increasing the burner-tip flow velocity of first straight outer flows. Further, it can be seen that the aforementioned kiln inside falling rate was further lowered, by making the second air flow channel 12 for forming first straight outer flows intermittent. This reveals that, with the cement kiln burner device 1 and the method for operating the cement kiln burner device according to the present invention, it is possible to effectively burn out combustible solid wastes RF with particle sizes of up to 30 mm in burner flame, without causing landing combustion thereof.

(Investigation 2)

In the investigation 1, the investigations were conducted for cases of fixing the number of injections in the second air flow channel 12 to 12. In contrast thereto, in the investigation 2, investigations were conducted through simulations (software: FLUENT manufactured by ANSYS JAPAN K.K.), in order to determine whether non-rigid plastic with a particle size of 30 mm was burned out within flame or in landing combustion, in cases of varying the number of injections in the second air flow channel 12, under the same combustion conditions as those for the cases where the burner-tip flow velocity of first straight outer flows was 150 m/s in the investigation 1. The following Table 3 illustrates the results thereof.

Incidentally, varying the number of opening portions (the number of injections) while fixing the primary air ratio (the $A_0$ ratio) of first straight outer flows to 5 vol %, and, further, fixing the burner-tip flow velocity of first straight outer flows to 150 m/s means maintaining the total sum of the areas of the opening portions 12c constant, by adjusting the width (the circumferential length) of the opening portions 12c and the thickness (the radial length) of the opening portions 12c, in FIG. 2.

TABLE 3

| Kiln inside falling rate (mass %) of non-rigid plastic | | | | | |
| --- | --- | --- | --- | --- | --- |
| | Opening-portion rate (area %) | | | | |
| Number of openings (number) | 20% | 40% | 60% | 80% | 100 % (Comparative Example) |
| 8 | 0 | 0 | 7 | 12 | 15 |
| 24 | 2 | 12 | 20 | 25 | 31 |
| 60 | 11 | 20 | 27 | 32 | 37 |

According to the results from the case where the burner-tip flow velocity of first straight outer flows was 150 m/s in Table 3 and Table 2, it can be seen that it was possible to provide an effect of lowering the kiln inside falling rate of the combustible solid waste RF with a particle size of 30 mm or less, by decreasing the number of openings for first straight outer flows, even under the condition where the burner-tip flow velocity of first straight outer flows was 150 m/s, which was a relatively lower flow velocity.

For example, when the opening-portion rate was 60 area % in Table 2 (namely, when the number of openings was 12), the kiln inside falling rate of the combustible solid waste RF was 16% when the burner-tip flow velocity was 150 m/s. In contrast thereto, according to Table 3, when the number of openings was 8, and the opening-portion rate was 60 area %, the kiln inside falling rate of the combustible solid waste RF was 7% when the burner-tip flow velocity was 150 m/s. This reveals that the kiln inside falling rate was lowered by the reduction of the number of openings. Further, as another example, it can be seen that, when the opening-portion rate was 40% in Table 3, the aforementioned kiln inside falling rate was lowered as the number of openings was decreased. The same results can be seen in the cases where the opening-portion rate was 20%, 60% and 80%.

Further, it can be seen that, with the same number of openings for first straight outer flows, the kiln inside falling rate of the combustible solid waste RF with a particle size of 30 mm or less could be lowered by decreasing the opening-portion rate. For example, in Table 2, it can be seen that, when the number of openings was 24, the kiln inside falling rate was lowered, as the opening-portion rate was lowered. The same results can be seen in the cases where the number of openings was 8 and 60.

It can be considered that these effects of the number of openings and the opening-portion rate for first straight outer flows, and the burner-tip flow velocity of first straight outer flows, which is illustrated in FIG. 2, are based on the influence of the magnitude of turbulent flows formed in burner flame. Namely, as turbulent flows formed therein have a larger magnitude, the kiln inside falling rate of combustible solid waste RF with a particle size of 30 mm or less can be lowered. However, it has been also revealed that, if turbulent flows with an excessively larger magnitude are formed in burner flame, this destabilizes the formation of burner flame, thereby degrading a temperature distribution within the cement kiln.

As described above, with the cement kiln burner device 1 and the method for operating the cement kiln burner device according to the present invention, it is possible to form desirable burner flame while effectively utilizing various types of combustible solid wastes, by optimizing the burner-tip flow velocity, the number of openings and the opening-portion rate for first straight outer flows, depending on changes of external factors for operating the burner, such as the type and the properties of the main fuel such as a powdered solid fuel, the type and the properties of combustible solid wastes.

<Other Embodiments>

Hereinafter, other embodiments will be described.

(1) In the aforementioned embodiment, the second air flow channel 12 has been described as being constituted by the plural opening portions 12c which all have the same center angle. However, these plural opening portions 12c can also include an opening portion 12c having a different center angle.

Similarly, in the aforementioned embodiment, the plural closed portions 12d, which sandwich the opening portions 12 therebetween in the circumferential direction, have been described as all having the same center angle. However, these plural closed portions 12d can also include a closed portion 12d having a different center angle.

(2) While, in the example of FIG. 3, there is illustrated a case where the cement kiln burner system 20 includes five blowing fans (F1 to F5), this aspect is merely an example and is not intended to restrict the present invention to this structure. For example, there can be also provided a common blowing fan as blowing fans (F2 and F4) for directing air flows to the first air flow channel 11 and the third air flow channel 13.

DESCRIPTION OF REFERENCE SIGNS

1 Cement kiln burner device
2 Powdered-solid-fuel flow channel
2a Swirl vane provided in powdered-solid-fuel flow channel
3 Oil flow channel
4 Combustible-solid-waste flow channel
9 Axis
11 First air flow channel
11a Swirl vane provided in first air flow channel
12 Second air flow channel
12c Opening portion
12d Closed portion
13 Third air flow channel
13a Swirl vane provided in third air flow channel
20 Cement kiln burner system
22 Pulverized-coal transfer pipe
24 Combustible-solid-waste transfer pipe
31, 32, 33 Air pipe
A Combustion air
C Pulverized coal
F1, F2, F3, F4, F5 Blowing fan
RF Combustible solid waste

What is claimed is:

1. A cement kiln burner device including a plurality of flow channels partitioned by a plurality of concentric cylindrical members, the cement kiln burner device comprising:
a powdered-solid-fuel flow channel including means for swirling a powdered-solid-fuel flow;
a first air flow channel placed outside the powdered-solid-fuel flow channel to be adjacent to the powdered-solid-fuel flow channel, the first air flow channel including means for swirling an air flow;
a second air flow channel placed outside the first air flow channel to be adjacent to the first air flow channel, the second air flow channel including means for straightly forwarding an air flow;
a third air flow channel placed inside the powdered-solid-fuel flow channel to be adjacent to the powdered-solid-fuel flow channel, the third air flow channel including means for swirling an air flow; and
a combustible-solid-waste flow channel placed inside the third air flow channel, wherein
of the first air flow channel, the second air flow channel, and the third air flow channel, only the second air flow channel includes an opening portion forming a port for injecting an air flow, and a closed portion covered for preventing an air flow from passing therethrough, and the opening portion and the closed portion are alternately arranged in a circumferential direction.

2. The cement kiln burner device according to claim 1, wherein an opening-portion rate, which is a ratio of a total area of the opening portion to an entire area of the second air flow channel when the second air flow channel is taken along a plane orthogonal to an axis center, is equal to or more than 20 area % and less than 80 area %, with respect to the entire area corresponding to 100 area %.

3. The cement kiln burner device according to claim 2, wherein a plurality of the opening portions and a plurality of the closed portions are placed at positions which are rotationally symmetric about the axis center of the second air flow channel.

4. A method for operating the cement kiln burner device according to-claim 2, wherein a flow velocity at a burner tip in the second air flow channel is 100 m/s to 400 m/s.

5. The method for operating the cement kiln burner device according to claim 4, wherein
the powdered-solid-fuel flow from the powdered-solid-fuel flow channel has a swirl angle of 0 degree to 15 degrees at the burner tip,
the air flow from the first air flow channel has a swirl angle of 1 degree to 50 degrees at the burner tip, and
the air flow from the third air flow channel has a swirl angle of 30 degrees to 50 degrees at the burner tip.

6. The method for operating the cement kiln burner device according to claim 5, wherein
a flow velocity at the burner tip in the powdered-solid-fuel flow channel is 30 m/s to 80 m/s,
a flow velocity at the burner tip in the first air flow channel is 60 m/s to 240 m/s,
a flow velocity at the burner tip in the third air flow channel is 5 m/s to 240 m/s, and
a flow velocity at the burner tip in the combustible-solid-waste flow channel is 30 m/s to 80 m/s.

7. The cement kiln burner device according to claim 1, wherein a plurality of the opening portions and a plurality of the closed portions are placed at positions which are rotationally symmetric about the axis center of the second air flow channel.

8. A method for operating the cement kiln burner device according to-claim 7, wherein a flow velocity at a burner tip in the second air flow channel is 100 m/s to 400 m/s.

9. The method for operating the cement kiln burner device according to claim 8, wherein
the powdered-solid-fuel flow from the powdered-solid-fuel flow channel has a swirl angle of 0 degree to 15 degrees at the burner tip,
the air flow from the first air flow channel has a swirl angle of 1 degree to 50 degrees at the burner tip, and
the air flow from the third air flow channel has a swirl angle of 30 degrees to 50 degrees at the burner tip.

10. The method for operating the cement kiln burner device according to claim 9, wherein
a flow velocity at the burner tip in the powdered-solid-fuel flow channel is 30 m/s to 80 m/s,
a flow velocity at the burner tip in the first air flow channel is 60 m/s to 240 m/s,
a flow velocity at the burner tip in the third air flow channel is 5 m/s to 240 m/s, and
a flow velocity at the burner tip in the combustible-solid-waste flow channel is 30 m/s to 80 m/s.

11. A method for operating a cement kiln burner device comprising;
providing the cement kiln burner device according to claim 1, and
setting a flow velocity at a burner tip in the second air flow channel 100 m/s to 400 m/s.

12. The method for operating a cement kiln burner device according to claim 11, wherein
the powdered-solid-fuel flow from the powdered-solid-fuel flow channel has a swirl angle of 0 degree to 15 degrees at the burner tip,
the air flow from the first air flow channel has a swirl angle of 1 degree to 50 degrees at the burner tip, and
the air flow from the third air flow channel has a swirl angle of 30 degrees to 50 degrees at the burner tip.

13. The method for operating the cement kiln burner device according to claim 12, wherein
a flow velocity at the burner tip in the powdered-solid-fuel flow channel is 30 m/s to 80 m/s,
a flow velocity at the burner tip in the first air flow channel is 60 m/s to 240 m/s,
a flow velocity at the burner tip in the third air flow channel is 5 m/s to 240 m/s, and
a flow velocity at the burner tip in the combustible-solid-waste flow channel is 30 m/s to 80 m/s.

14. The method for operating the cement kiln burner device according to claim 12, wherein a product of an amount of primary air ($m^3N/min$) and a burner-tip flow velocity (m/s) of the air flow at the burner tip in the second air flow channel is larger than a product of an amount of primary air ($m^3N/min$) and a burner-tip flow velocity (m/s) of the air flow at the burner tip in each of other air flow channels.

15. The method for operating the cement kiln burner device according to claim 11, wherein
a flow velocity at the burner tip in the powdered-solid-fuel flow channel is 30 m/s to 80 m/s,
a flow velocity at the burner tip in the first air flow channel is 60 m/s to 240 m/s,
a flow velocity at the burner tip in the third air flow channel is 5 m/s to 240 m/s, and
a flow velocity at the burner tip in the combustible-solid-waste flow channel is 30 m/s to 80 m/s.

16. The method for operating the cement kiln burner device according to claim 15, wherein a product of an amount of primary air ($m^3N/min$) and a burner-tip flow velocity (m/s) of the air flow at the burner tip in the second air flow channel is larger than a product of an amount of primary air ($m^3N/min$) and a burner-tip flow velocity (m/s) of the air flow at the burner tip in each of other air flow channels.

17. The method for operating the cement kiln burner device according to claim 11, wherein a product of an amount of primary air ($m^3N/min$) and a burner-tip flow velocity (m/s) of the air flow at the burner tip in the second air flow channel is larger than a product of an amount of primary air ($m^3N/min$) and a burner-tip flow velocity (m/s) of the air flow at the burner tip in each of other air flow channels.

18. The method for operating the cement kiln burner device according to claim 11, wherein a combustible solid waste ejected from the combustible-solid-waste flow channel has a particle size of 30 mm or less.

* * * * *